United States Patent
Brendza et al.

(10) Patent No.: US 8,656,353 B2
(45) Date of Patent: Feb. 18, 2014

(54) MOBILE APPLICATION GENERATOR

(71) Applicant: User-Friendly Phone Book, L.L.C., The Woodlands, TX (US)

(72) Inventors: Mary Beth Brendza, Austin, TX (US); Bruce C. Howard, Spring, TX (US)

(73) Assignee: User-Friendly Phone Book, L.L.C., The Woodlands, TX (US)

( * ) Notice: Subject to any disclaimer, the term of this patent is extended or adjusted under 35 U.S.C. 154(b) by 0 days.

(21) Appl. No.: 13/788,639

(22) Filed: Mar. 7, 2013

(65) Prior Publication Data

US 2013/0239086 A1    Sep. 12, 2013

Related U.S. Application Data

(60) Provisional application No. 61/608,736, filed on Mar. 9, 2012.

(51) Int. Cl.
 *G06F 9/45* (2006.01)
(52) U.S. Cl.
 USPC ......................................... 717/109
(58) Field of Classification Search
 USPC ......................................... 717/109
 See application file for complete search history.

(56) References Cited

U.S. PATENT DOCUMENTS

| | | | |
|---|---|---|---|
| 2008/0195997 A1* | 8/2008 | Herberger et al. | 717/100 |
| 2010/0281475 A1* | 11/2010 | Jain et al. | 717/172 |
| 2012/0260232 A1* | 10/2012 | Hirsch et al. | 717/107 |
| 2013/0132848 A1 | 5/2013 | Bhatt | |

OTHER PUBLICATIONS

International Search Report for and Written Opinion of the International Searching Authority for International Patent Application No. PCT/US13/29940 mailed May 21, 2013.

\* cited by examiner

*Primary Examiner* — John Chavis
(74) *Attorney, Agent, or Firm* — Lowenstein Sandler LLP

(57) ABSTRACT

A system and a method are disclosed for receiving a request to create a mobile application, the request comprising provider-specific application information and provider-specific content for the mobile application, generating, by a processing device, an application description based on the provider-specific application information, wherein the application description comprises a selection of one or more application features for the mobile application, retrieving, by the processing device, a base mobile application stored in a data store, wherein the base mobile application comprises previously generated base application software code, modifying, by the processing device, the base mobile application in view of the application description; and generating, by the processing device, binary mobile application code for the mobile application in view of the modified base mobile application.

23 Claims, 17 Drawing Sheets

Receive Provider Business Information
Basic Listing Information

User Friendly Apps Express Checklist (* denotes required field)

Customer Contact First Name: _____ Last Name: _____ Web Start: _____ Web End: _____ Run With Book Pub: _____
UDAC Sold: _____ Monthly Rate: _____ Sales Rep ID: _____ Rep: _____ Market: _____

BUSINESS INFORMATION The information below is how your business's general contact information will appear on the site.

*Business Name: _____
Address: _____ Suite/Apt#: _____ City: _____ *Phone: _____ State: _____
Toll-Free #: _____ Fax #: _____
Web Address: _____ *E-Mail Address: _____
Facebook Fan Page Name: _____ Twitter Username: _____

Logo: [    ]   Display Address? [ ]

CATEGORY TARGETING Write the heading descriptions and heading codes where you want your business to appear in search results
(Suggestions: Include Business Name, Location and Keywords.)

Category Tag 1: _____ Category Tag 2: _____

BUSINESS HOURS Write in the hours of operation for your business

| MO | TU | WE | TH | FR | SA | SU |
|----|----|----|----|----|----|----|
|    |    |    |    |    |    |    |
|    |    |    |    |    |    |    |

[ ] 24 Hours   [ ] By Appointment   [ ] Emergency Service

Receive App Specific Business Information And App Photos — 600, 610

Products and Services

What Products and Services Does the Advertiser want to include in the App?

| Product | Price | Product |
|---|---|---|
| | | |
| | | |
| | | |
| | | |

DEALS — Write coupon offers that will entice users to click on your profile and give your business a try. (Limit 4)

| | Title | What type of Deal is this? | Description | Terms | Start | End |
|---|---|---|---|---|---|---|
| 1 | | ☐ % Off ☐ Clearance ☐ Coupon Code ☐ Dollars Off<br>☐ BOGO ☐ Contest ☐ Daily Special ☐ Exclusive Offer | | ☐ Free First Visit ☐ Free Shipping ☐ Happy Hour ☐ Promo Code ☐ Sale<br>☐ Free Gift ☐ Free Trial ☐ New Customer ☐ Promo Event ☐ Other: | | |
| 2 | | ☐ % Off ☐ Clearance ☐ Coupon Code ☐ Dollars Off<br>☐ BOGO ☐ Contest ☐ Daily Special ☐ Exclusive Offer | | ☐ Free First Visit ☐ Free Shipping ☐ Happy Hour ☐ Promo Code ☐ Sale<br>☐ Free Gift ☐ Free Trial ☐ New Customer ☐ Promo Event ☐ Other: | | |
| 3 | | ☐ % Off ☐ Clearance ☐ Coupon Code ☐ Dollars Off<br>☐ BOGO ☐ Contest ☐ Daily Special ☐ Exclusive Offer | | ☐ Free First Visit ☐ Free Shipping ☐ Happy Hour ☐ Promo Code ☐ Sale<br>☐ Free Gift ☐ Free Trial ☐ New Customer ☐ Promo Event ☐ Other: | | |
| 4 | | ☐ % Off ☐ Clearance ☐ Coupon Code ☐ Dollars Off<br>☐ BOGO ☐ Contest ☐ Daily Special ☐ Exclusive Offer | | ☐ Free First Visit ☐ Free Shipping ☐ Happy Hour ☐ Promo Code ☐ Sale<br>☐ Free Gift ☐ Free Trial ☐ New Customer ☐ Promo Event ☐ Other: | | |

App ABOUT US Copy

000 Character Limit - Characters Typed in Cell Above

Use Owners Message From Existing Profile _____ ☐ Images Created with App Image From

Image Files

PHOTO FILENAMES
1. Header: _____ 2. Login: _____
3. Support: _____ 4. App Icon: _____

*Fig. 6*

Receive An Indication Of Special Features

UF Apps

Specify the features that the advertiser wants in the App

Appointments: Does the advertiser want to schedule Appointments via the app?
- ☐ Appointment Request - Email Verified (Default)
- ☐ Automatic Scheduling
- ☐ Adv. Does not want Scheduling Feature

Payments Feature: Does the advertiser want to receive payments via the app?
- ☐ Yes: Adv. has PayPal Account. Email Address is: _____
  Account Number is: _____
- ☐ Yes, but Adv. Doesn't have PayPal Account email info to: _____
- ☐ No, Adv. Does not want Payments Feature

Messaging:
- ☐ Does Adv. want to receive SMS texts from App: _____
- ☐ Does Adv. want to receive e-mails from their App: _____
  If yes, and diff. # from above: _____

Deals Feature:
- ☐ Advertiser wants deals on their app
- ☐ Use Deals from GoLocal247 Profile

*Fig. 7*

Receive An Indication Of Special Features

Deals Feature:
☐ Advertiser wants deals on their app
_____

| DEALS | | Wire coupon offers that will entice users to click on your profile and give your business a try. (Limit 4) | | | |
|---|---|---|---|---|---|
| | Title | | Description | Terms | Start | End |
| 1 | | What type of Deal is this? | ☐ % Off   ☐ Clearance ☐ Coupon Code ☐ Dollars Off     ☐ Free First Visit ☐ Free Shipping ☐ Happy Hour   ☐ Promo Code ☐ Sale | | |
| | | | ☐ BOGO  ☐ Contest   ☐ Daily Special ☐ Exclusive Offer ☐ Free Gift        ☐ Free Trail    ☐ New Customer ☐ Promo Event ☐ Other: | | |
| 2 | | What type of Deal is this? | ☐ % Off   ☐ Clearance ☐ Coupon Code ☐ Dollars Off     ☐ Free First Visit ☐ Free Shipping ☐ Happy Hour   ☐ Promo Code ☐ Sale | | |
| | | | ☐ BOGO  ☐ Contest   ☐ Daily Special ☐ Exclusive Offer ☐ Free Gift        ☐ Free Trail    ☐ New Customer ☐ Promo Event ☐ Other: | | |
| 3 | | What type of Deal is this? | ☐ % Off   ☐ Clearance ☐ Coupon Code ☐ Dollars Off     ☐ Free First Visit ☐ Free Shipping ☐ Happy Hour   ☐ Promo Code ☐ Sale | | |
| | | | ☐ BOGO  ☐ Contest   ☐ Daily Special ☐ Exclusive Offer ☐ Free Gift        ☐ Free Trail    ☐ New Customer ☐ Promo Event ☐ Other: | | |
| 4 | | What type of Deal is this? | ☐ % Off   ☐ Clearance ☐ Coupon Code ☐ Dollars Off     ☐ Free First Visit ☐ Free Shipping ☐ Happy Hour   ☐ Promo Code ☐ Sale | | |
| | | | ☐ BOGO  ☐ Contest   ☐ Daily Special ☐ Exclusive Offer ☐ Free Gift        ☐ Free Trail    ☐ New Customer ☐ Promo Event ☐ Other: | | |

*Fig. 8*

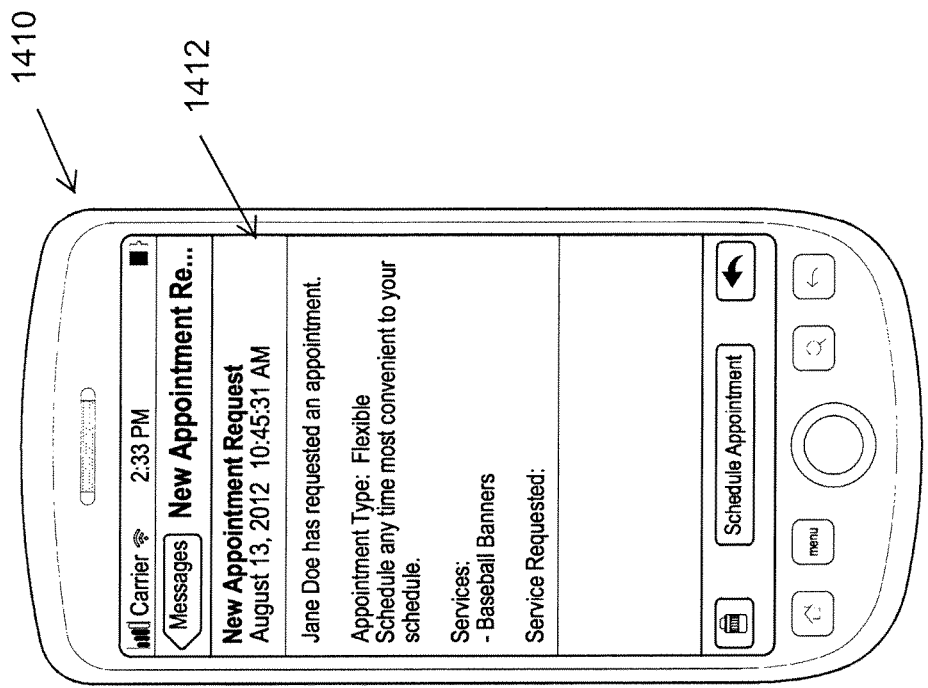
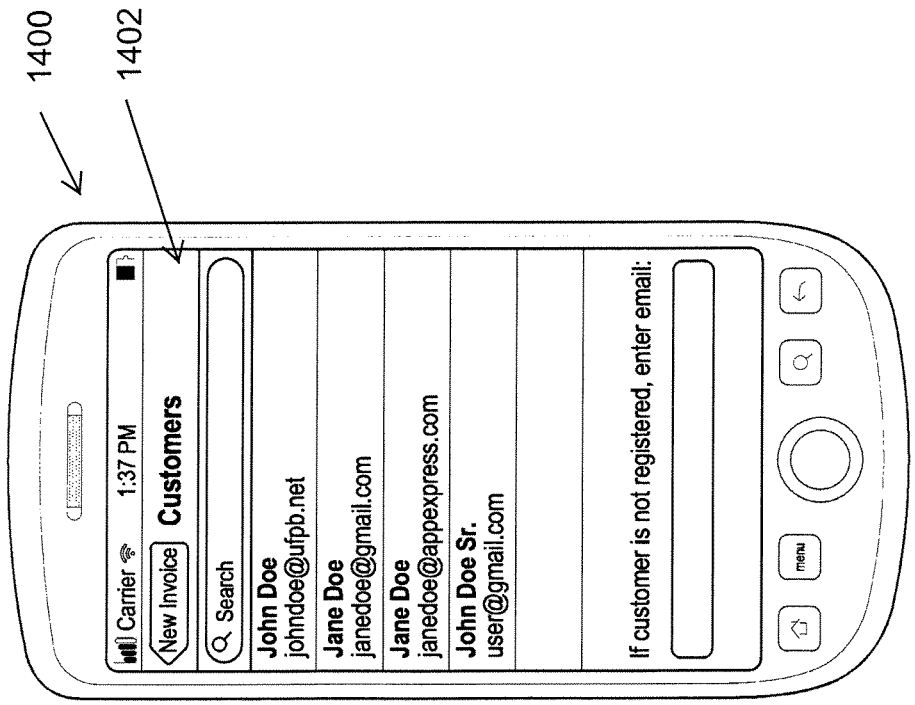

MOBILE APPLICATION GENERATOR

RELATED APPLICATIONS

The present application claims the benefit of U.S. Provisional Application Ser. No. 61/608,736, titled "Mobile Application Generator," filed on Mar. 9, 2012, the entire contents of which are herein incorporated by reference.

TECHNICAL FIELD

The present disclosure relates to the field of mobile applications. Specifically, the examples of the present disclosure relate to automated generation of mobile applications.

BACKGROUND

Mobile applications, also called mobile apps or apps, are software applications, usually designed to run on smartphones, tablet computers, and other handheld devices. They are available through application distribution platforms, which are typically operated by the owner of the mobile operating system, such as the Apple® App Store, Android® Market, and BlackBerry® App World. Some mobile apps are free, and others may have a price. Usually the mobile apps are downloaded from the platform to a target device such as to one of the iPhone®, BlackBerry®, or Android® phones. Alternatively, they can be downloaded to other types of computers such as a laptops or desktops. Mobile apps were originally intended for productivity: e.g., email, calendar and contact databases, however, public demand caused rapid expansion into other areas such as mobile games, factory automation, global positioning systems (GPS) and location-based services, banking, order-tracking, and ticket purchases, and the like.

Mobile application development is the process by which application software is developed for handheld devices such as personal digital assistants, enterprise digital assistants or mobile phones. These mobile applications may be either pre-installed on phones during manufacture, may be downloaded by consumers from various mobile software distribution platforms, or may be web applications delivered over HTTP which use server-side or client-side processing (e.g. JavaScript) to provide an "application-like" experience within a Web browser. Android®, iOS®, BlackBerry®, HP webOS®, Symbian® OS, and Windows Mobile® operating systems support application binaries as found on personal computers with code which executes in the native machine format of the processor. Platforms for mobile applications also may have an integrated development environment that provides tools to allow a developer to write, test, and deploy applications into the target platform environment.

Typically, a software developer writes application software for an application provider for a specific task to be executed on a certain platform or operating system. If a second application provider desires to be able to offer the same mobile application, the software developer manually customizes the mobile application to reflect the second application provider. If a provider desires a mobile application to present one view of a certain function to a consumer and a second view to the provider, the software developer manually generates two different applications. As such, the manual process for generating mobile applications can be both costly and time consuming.

BRIEF DESCRIPTION OF THE DRAWINGS

Implementations of the present disclosure will be understood more fully from the detailed description given below and from the accompanying drawings of various implementations of the disclosure, which should not be taken to limit the disclosure to the specific aspects or implementations, but are for explanation and understanding.

FIGS. 5-9 are displays of an automated application generator according to various embodiments.

FIGS. 13A-13E, 14A and 14B are displays of an automated application generator according to various embodiments.

DETAILED DESCRIPTION

A method and system for automated application generation is described. In the following description, numerous details are set forth. It will be apparent to one of ordinary skill in the art having the benefit of this disclosure, that examples of the present teachings may be practiced in the absence of these specific details. In some instances, well-known structures and devices are shown in block diagram form instead of in detail in order to avoid obscuring the examples of the present teachings.

The examples described herein may provide an automated mobile application generator (also referred to herein as a mobile app generator). The mobile app generator may be used to create and publish customized mobile applications (also referred to herein as mobile apps). These mobile apps may be generated for small, medium or large entities, who may be vendors of various products or services. Hereinafter these vendors may be referred to as providers. Those serviced by these providers are referred to as consumers or customers. These providers may distribute the mobile apps to their respective end-user consumers for use on mobile devices.

Figure 1:
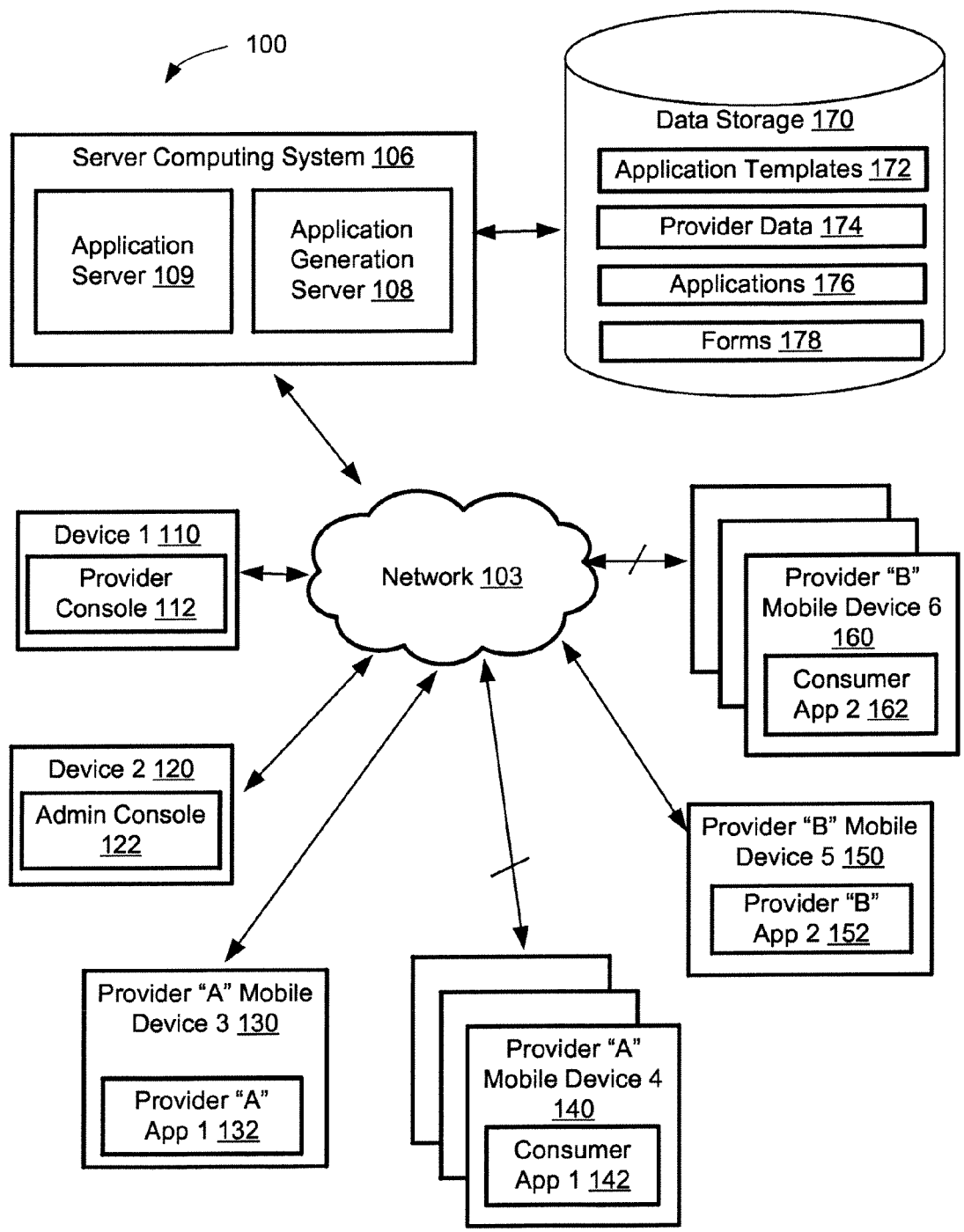
FIG. 1 is a block diagram of a network architecture in which embodiments of a mobile application generator may operate.

FIG. 1 is a block diagram of a network architecture 100 in which embodiments of a mobile application generator may operate. In the depicted embodiment, a server computing system 106 includes an application generation server 108 and an application programming interface (API) application server 109. The server computing system 106 may interact with mobile apps, e.g., provider console 112, admin console 122, provider "A" app 1 132, consumer app 1 142, provider "B" App 2 152, and consumer app 2 162. The mobile apps generated by the server computing system 106 may have two separate components, a server-side component and a client-side component. The network architecture 100 may include multiple client computing systems (referred to herein as device 1 110, device 2 120, provider "A" mobile device 3 130, provider "A" mobile device 4 140, provider "B" mobile device 5 150, and provider "B" mobile device 6 160, collectively referred to herein as "consumer computing systems") that may be coupled to the server computing system 106 via a data communications network (e.g., network 103) which may include a public network such as the Internet or private network such as a local area network (LAN).

The provider console 112 and the admin console 122 can be graphical user interfaces (GUIs) or other user interfaces that access the server computing system 106, such as a browser or any device that can access the consoles. The provider console 112 and the admin console 122 may serve two different functions. In one embodiment, the provider console 112 enables a provider or a vendor to communicate with the server computing system 106 to submit and configure input for the generation of their mobile app and to monitor the mobile app generation process. The admin console 122 enables an administrator or operator of the server computing system 106 (or the application generation server 108 and API application server 109) to communicate with the server computing system 106 to perform administrative tasks such operations, maintenance and provisioning.

The network 103 may include the Internet and network connections to the Internet. Alternatively, the server computing system 106 and the consumer computing systems may be located on a common local area network (LAN), personal area network (PAN), campus area network (CAN), metropolitan area network (MAN), Wide area network (WAN), wireless local area network, cellular network, virtual local area network, or the like. Examples of the consumer computing systems may include a consumer workstation, a server, a computer, a portable electronic device, an entertainment system configured to communicate over a network, such as a set-top box, a digital receiver, a digital television, a mobile phone, or other electronic devices. For example, portable electronic devices may include, but are not limited to, cellular phones, portable gaming systems, portable computing devices, or the like. The consumer computing systems may have access to the Internet via a firewall, a router, or other packet switching devices. The server computing system 106 may be a network appliance, a gateway, a personal computer, a desktop computer, a workstation, etc.

In one example, an automated app generator can include the server computing system 106 which can include the application generation server 108 and the application server 109. The serving computing system 106 may provide a provider portal (e.g., provider console 112), which may be a web front-end, such as a web-based interface, where the provider-specific application information can be entered and a feature tier can be selected. The provider portal may enable providers to customize the mobile app to be generated, such as to enter their business information, generate deals, manage their schedules and create alerts as described herein. The provider portal may provide an interface with most of the other back end components and help orchestrate and visualize the status of the different operations. This component may also be hosted by other servers, such as a third-party server.

In one embodiment, a provider can select, input, or otherwise specify configuration details of the mobile app via the provider console 112. The feature tier may indicate which features can be enabled for this particular mobile app. Once the provider-specific application information is entered, the application generation server 108 can generate a binary of the client-side application that can be submitted to the app stores or app marketplaces of the designated platform, such as the Apple® App Store, Google Play Store®, HTML5®, and BlackBerry® App World. These mobile apps may be configured to communicate with the current generation API via the application generation server 109 (or API application servers) to enable features locally and to access the desired features as described herein. In an embodiment, the application generation server 109 may automatically and/or simultaneously update multiple mobile apps to create new versions of the mobile apps, such as when adding additional features to the mobile base app. In an embodiment, the mobile app can be configured to display a specific view to a provider and display a different view to a consumer. In some cases the same mobile app may be configured to enable a provider to have access to certain features of the mobile app while the consumer has access to different features of the mobile app.

In the depicted example, the server computing system 106 may execute the application generation server 108 and the application server 109 to orchestrate the automated application generation process as described herein. Alternatively, the functionality of the application generation server 108 can be distributed over the two or more machines. For example, the server computing system 106 may implement the application generation server 108 and not the application server 109, and another server computing system (not illustrated) can implement the application server 109. Alternatively, other configurations are possible as would be appreciated by one of ordinary skill in the art having the benefit of this disclosure.

In one example, the application server 109 may operate as a server-side API that enables features, allows media uploads and downloads, allows scheduling, and allows payments. The application server 109 may allow a provider to access the data contained in an application description document (discussed below). The corresponding client-side API may update the configuration when the client-side API is launched if there were any changes as described above.

Regarding media uploads and downloads, the application server 109 may provide endpoints to store and access media uploaded by providers and application users. The uploaded APIs may store the data on an external storage system (e.g., Amazon® s3 service, Akamai® service, etc.) to minimize the cost of storing data and improving the download performance. Alternatively, the application server 109 can store the data in data storage 170 as described below. The media access APIs may provide a list of media and their respective locations, and the mobile app may use this information to display the media.

Regarding scheduling, the application server 109 may enable providers with the ability to accept appointments through the client-side component of the mobile app. The application server 109 may also be configured to send or push out service reminders to the users of the mobile apps. These events and reminders may be sent using push notifications. Alternatively, the client-side applications may be configured to pull the data. The client side application may respond to these notifications and allow the capability to add these events to the user's calendar. The back-end scheduling system may be implemented as part of a back-end of the application server 109.

In an embodiment, a scheduling and notification system may be a component of the server computing system 106 to provide a customizable scheduling and notification delivery system that can be used across various channels. The scheduling and notification system may be accessible through an API and may route notifications via push, e-mail, SMS or through social networks such as via the Twitter® and Facebook® services. The notification system may have a set of heuristics to determine the best communication channel for a given notification.

Regarding payments, the application server 109 may provide a payment system to be used by providers to accept payments from their clients. The payment system may be part of the back-end of the application server 109, or may interface to a third-party technology. In one example, the payments may be routed through an automated payment system such as the PayPal® service which may then transfer payments to the individual providers.

The network architecture 100 may also include one or more content repositories, illustrated as data storage 170. The data storage 170 may be a content repository in which application templates 172, provider data 174, applications 176, and forms 178 may be stored. The application templates 172 may be a mobile application design template for creating a mobile app. Such template may include, for example, a certain area to include a logo, another area to include a photo, and a third area to include a company name and description. Provider data 174 may include, but is not limited to, provider-specific application information that is such as the business name, address, contact number, and the like. Applications 176 may include the generated mobile apps that are customized for the provider. Forms 178 may include different types of documents with blank fields for the insertion of details or information.

In other examples, the network architecture 100 may include other devices as would be appreciated by one of ordinary skill in the art having the benefit of this disclosure. In one example, the data storage 170 may include a core data store and engine. The core data store and engine may be configured to store data, preferences and recommendations of the consumers and providers, as well as the interactions. The core data store and engine may be capable of learning users' preferences and can offer suggestions for providing certain products and services. The core data store and engine may also provide a framework for matchmaking consumers and businesses. Data may be collected regarding the consumers' preferred providers and their buying habits, in which the collected data may be used in future mobile apps.

Additionally, the core data store and engine may (i) support "white label" licensing, (ii) ensure that data is stored in one complete system to the greatest extent possible, (iii) allow features to be created once and reused in any number of applications, (iv) provide a framework for application builds on abilities of previous apps, (v) provide a framework so that it can grow and scale while not requiring unreasonable amounts of rework or additional development, or a combination thereof.

In another example, a QR code management system may be integrated into the server computing system 106. The QR Code management system ("QRCMS") may allow for automated creation of dynamic QR Codes that may link an image to a specific uniform resource locator (URL) when scanned utilizing software designed to interpret QR Codes. For an example use case, the QR code management system can be used in a couponing solution. The couponing solution may use 'smart' QR codes to provide tracking, metrics as well as a lasting reminder of the coupon. This may limit fraud by monitoring unauthorized use of a coupon with minimal infrastructure requirements for the provider. The consumer may receive an individually serialized coupon from the provider either via email or through the 'coupon wallet' in the app. The consumer or customer can either print the email containing the coupon, or print a screen shot of the email containing the coupon, or present the QR code to the provider via their mobile device. As used herein, a consumer includes a customer of the provider.

In an embodiment, a QR code generator and validator may be a component of the server computing system 106 to generate and validate QR codes that may be used within the deal system. This component may include an API that can create and validate QR codes and a QR Code scanner that may be used inside of the mobile apps. The component may include a record keeping system to ensure that QR code deals are only redeemed once, and may also include a set of analytic tools to be able to measure the redemption rate and success of a campaign.

If the consumer scans their own coupon by accident or out of curiosity, their web browser may be pointed to the coupon campaign management site for further information about the coupon and/or for further information about the provider. At the point of sale, the provider can scan the code with their mobile app. Scanning the code may allow the provider to determine if the code has been previously redeemed and if the coupon is unredeemed, then the provider can apply the discount, and the coupon may be set as no longer being valid. Once the coupon has been redeemed, if a consumer scans the code, the consumer may receive information explaining the coupon status and potentially the opportunity to purchase another coupon if the provider so wishes. The provider can verify that the coupon is real and valid by scanning it from the provider mobile device and can log the coupon into their couponing campaign. This may permit the provider to evaluate the metrics gathered around how many coupons have been sold, coupons outstanding, or the like.

The automated app generator may create mobile apps for various mobile platforms for one or multiple providers. In one example, the automated app generator can create a same basic mobile app for the multiple providers, and also allows for branding and other customization of information used by the same basic mobile app. For example, a provider may be able to select from a group of feature blocks according to their needs. These features can be enabled or disabled without any change to the application binary of the created application. For instance, provider "A" app 1 132 and provider "B" app 2 152 may be generated from the same basic app and customized to distinguish the different respective providers. In another embodiment, the provider app (e.g., provider "A" app 1 132) may be generated from the same basic app as the consumer app (e.g., consumer app 1 142) with each respective app customized to include different access capabilities, views, and configurations to distinguish the provider app from the consumer app.

Figure 2:
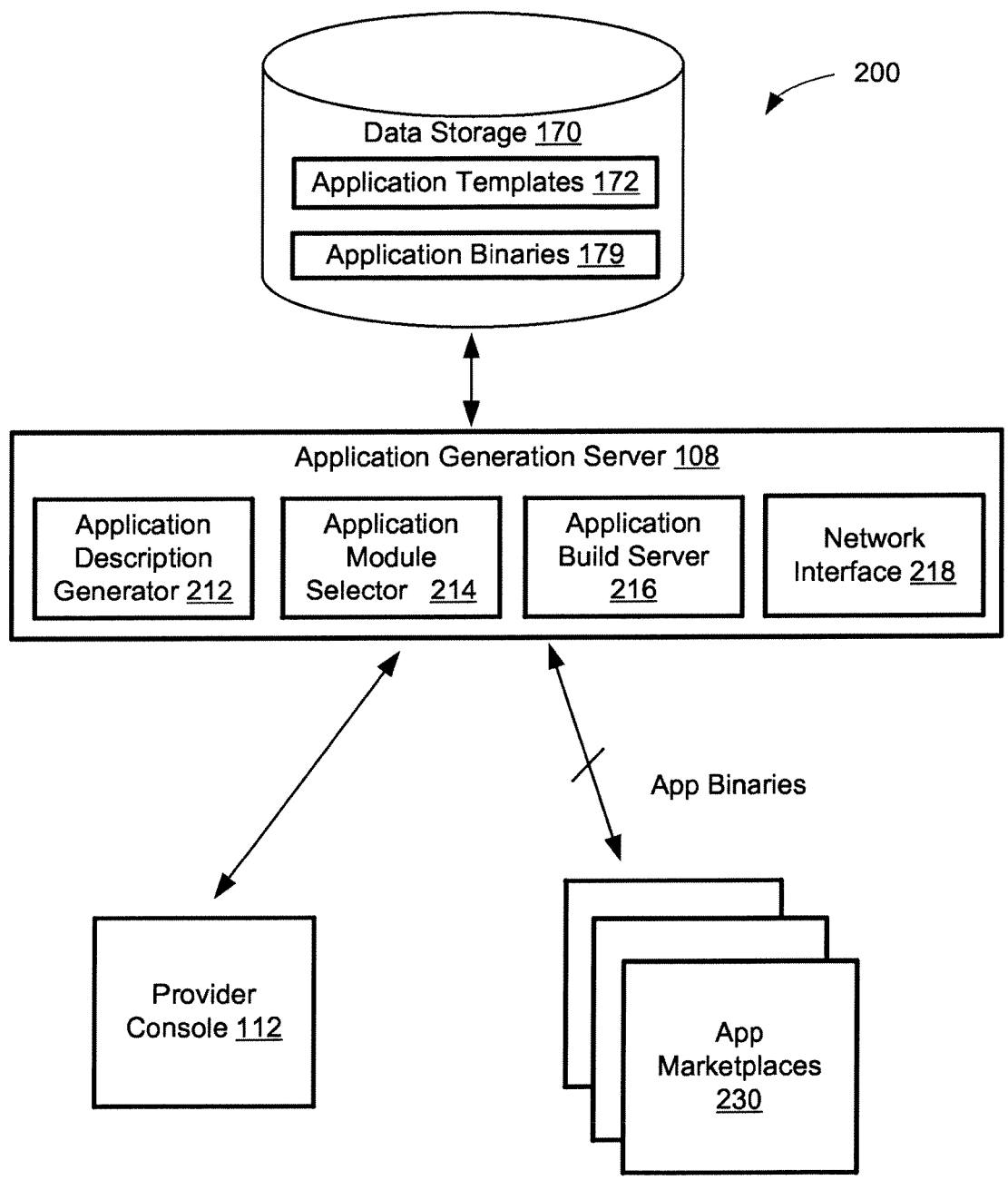
FIG. 2 is a block diagram of a network architecture in which embodiments of a mobile application generator may operate.

The mobile app generator may allow for the automated creation or partially automated creation of mobile apps on (1) a basic tier, which may provide company information, methods of contacting the provider, service pricing, hours of service and service area, (2) an enhanced tier, which may provide, in addition to the basic tier, scheduling, media access (video and audio from within the mobile app), and mobile website support, and (3) a premium tier, which may provide payment capabilities and calendar reminders. The mobile application generator may give the provider the ability to upgrade and downgrade to different tiers, so that a sales team may offer such different tiers of the mobile apps to different providers. These mobile apps can be submitted for approval to the Apple® App Store, Google Play Store®, HTML5®, and BlackBerry® App World, or other mobile app marketplaces (also referred herein as app stores). The mobile apps may be created by the mobile app generator to follow the functional and technical specifications of these mobile app stores. In one embodiment, the mobile app generator may submit the app generated binaries to the app stores on behalf of the providers. Alternatively, the providers can submit the binaries to the app stores themselves. Links and websites and other online tools can be automatically created as part of a provider's discovery page to link the mobile apps within the respective app stores to provide the consumer with greater visibility and accessibility of the mobile app. The mobile application generator architecture may be scalable and may allow for the regular introduction of new features and updates FIG. 2 is a block diagram of a network architecture 200 in which embodiments of a mobile application generator may operate. The network architecture 200 includes the application generation server 108, the data storage 170, the provider console 112, and app marketplaces 230.

The application generation server 108 may include the application description generator 212, the application module selector 214, the Application Build Server 216, and the Network Interface 218.

The application description generator 212 may be responsible for generating an application description document based on input from a provider console 112 that may reside on a client computing system as discussed with respect to FIG. 1. An interactive App Building Display may be available on the provider console 112 to facilitate the input for the application description generator 212, for presenting the user interface to receive the request to create the mobile application, to receive the provider-specific application information, and to receive the provider-specific content The application description document may be generated after a new application is created. The application description document may be a JavaScript Object Notation (JSON) document that defines the features that are activated for that provider-specific mobile app. JSON documents are language independent, lightweight text-based scripting language that can represent simple data structures, also called objects. Alternatively, the application description document may be other types of documents than JSON documents as would be appreciated by one of ordinary skill in the art having the benefit of this disclosure. The application description document may also include provider data for the particular provider, such as provider name, address, operating schedule, area of service, contact method, pricing and asset locations (custom images, sounds, media, etc.), or the like. In one example, an initial version of this document is shipped with the application binary. The application server 109 may update this application description document to allow providers to update their information, add or remove features without updating the application binary.

The application module selector 214 may be responsible for selecting an application module based on the application description document that may be generated by the application description generator 212. For example, the application module selector 214 may select an application template 172 or an application binary 179 from the data storage 170. The application template 172 may be a template that allows a client or consumer to input data to customize an application. The application binary 179 may be a pre-configured application which may be customized based on the information in the application template 172.

The application build server 216 may be responsible for building an application module based on module that may be selected by the application module selector 214. Examples of methods for building an application module are discussed in further detail below.

The network interface 218 may be responsible for providing an interface between the application generation server 108, the data storage 170, the provider consoles 112 via the client computing devices, and the app marketplaces 230. Examples of app marketplaces 230 include Apple® App Store, Google Play Store®, HTML5®, and BlackBerry® App World, and other mobile app stores. The application generation server 108 may also receive and transmit information to and from other computers (not shown) via the network interface 218.

Figure 3:
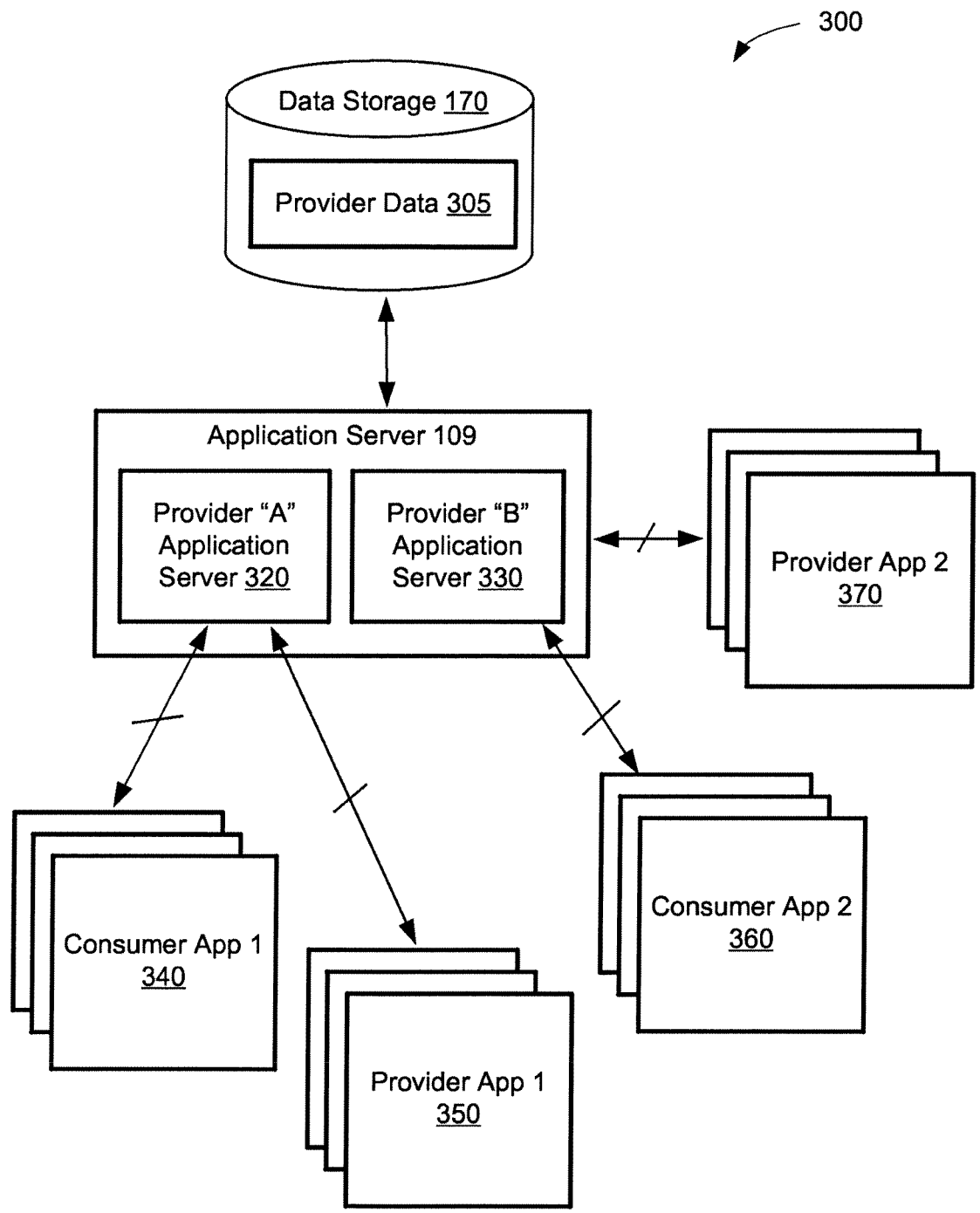
FIG. 3 is a block diagram of a network architecture in which embodiments of a mobile application generator may operate.

FIG. 3 is a block diagram of a network architecture 300 in which embodiments of a mobile application generator may operate. The network architecture 300 includes the application server 109, the data storage 170, consumer app 1 340, consumer app 2 360, and provider app 1 350, and provider app 2 370. As noted earlier, a console such as a web-based GUI in a browser or client application (not the mobile app generated by the application generation server 108) may enable a provider to input information such as graphics, photos, text, and select application modules to be transmitted the application generation server 108.

The application server 109 may include a separate server for each provider, for example, provider "A" application server 320 and provider "B" application server 330. The application server 109 may retrieve provider data 305 from the data storage 170. The provider data 305 may be data that is specific to an individual provider, such as specific business information and special features that may be desired by the provider.

Provider "A" application server 320 may be responsible for providing a mobile app (in this example case, "app 1") to the provider and to the consumer. In an example, the same application (e.g., "app 1") may be presented as one view and configuration for the provider (e.g., provider app 1 350) and may be presented as a different view and configuration for the consumer (e.g., consumer app 1 340). In other words, the mobile app may have multiple versions and multiple interfaces, for example, a consumer version and interface and a provider version and interface. In an embodiment, the provider may use an updated version of the mobile app while the consumer may use a prior version of the mobile app. The multiple user interfaces of the same mobile app (e.g., a user interface for the provider and a user interface for the consumer) can enable the consumer and provider to see different items of interest. For example, the consumer may be interested in product pricing while the provider may be interested in payment status. The different sides of the payment system may involve different application modules, e.g., a module for the provider and a different module for the consumer. In another example, the same mobile app can use different calendar systems for the provider and the consumer. The mobile app may display information such as payment amount and due date to the consumer while the same app may be customized to display the payment received date and amount to the provider.

Figure 4:
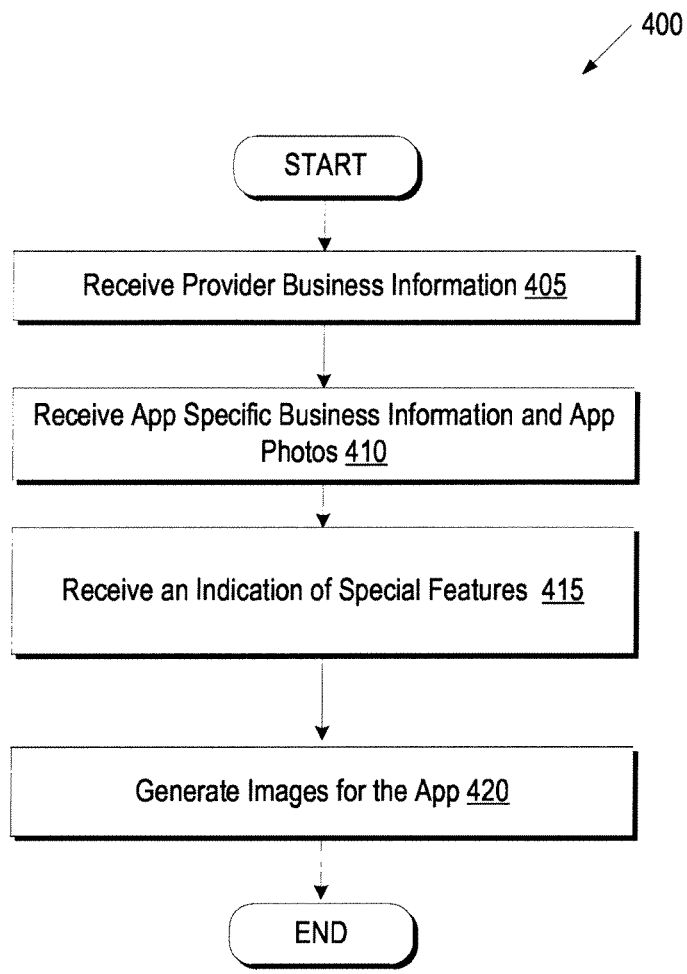
FIG. 4 is a flow diagram of a method of automated application generation according to certain embodiments.

FIG. 4 is a flow diagram of a method 400 of automated application generation according to certain embodiments. The method 400 is performed by processing logic that may comprise hardware (circuitry, dedicated logic, etc.), software (such may be executed on a general-purpose computing system or a dedicated machine), or a combination of both. A customized user interface of the mobile app may be generated. At block 405, the processing logic may receive general business information from a specific provider. Such general business information may include the business name, the business address and contact information, a logo, etc. At block 410, the processing logic may receive provider-specific application information such as business information about the provider, and provider-specific content such as photos and graphics to include with the mobile app. At block 415 the processing logic may receive an indication of special features to include with the app, such as a special deal or product promotion to customize the mobile app. At block 420, the processing logic may generate the image for the mobile app based on the received general business information, the application specific business information and photos, and the special features, and may generate the mobile app. In an embodiment, the processing logic may automatically update the mobile app to include new features and further customization, and the method 400 ends.

FIGS. 5-9 are displays of an automated application generator according to various embodiments. For example, the automated application generator may enable the provider to interactively design the mobile application interface via a website, or via a provider app in which the provider can input general business information, specific business information, graphics, photos, or the like.

FIG. 5 is a display 500 for receiving provider-specific application information from a specific provider. The display 500 may be, for example, in the form of a checklist 510 as shown or in other forms such as, but not limited to, menus, lists, a series of survey questions. As noted above, provider-specific application information may include general business information such as the business name, the business address and contact information, a logo, and the like. In an embodiment, a user interface may present the display 500 that includes fields to receive application-specific business information and graphics. The user interface may receive application-specific business information and graphics to be extracted and populated into content fields of the base mobile application via the display 500.

FIG. 6 is a display 600 for receiving provider-specific content such as specific business information, photos, logos, and graphics from a specific provider. The display 600 may include, for example, a form 610 that may include a list of product and service offerings and their associated prices. The display 600 may also include an area to attach a photo or an image file and fields for labeling the photo or image. In an embodiment, a user interface may present the display 600 as form 610 that includes fields for the provider-specific content. The user interface may receive the form 610 that can include the provider-specific content to be extracted and processed in generating the mobile app.

FIG. 7 is a display 700 for receiving an indication of special features from a specific provider. Special features may include options 710 for the provider to be able to schedule appointments via the mobile app, to receive text messages and/or emails from the mobile app. A special feature may also include payment features 720, such as the option to receive payments via the mobile app and if so, the types of payments. For example, the provider may wish to be able to receive payments from an automated service such as the PayPal® service. The display 700 may also enable the provider to receive payments from certain types of credit cards but not from others. For example, the display 700 may enable the provider with an option to only receive credit card payment from American Express® cards but not from Visa® cards, or vice-versa. The display 700 may also include the ability for the provider to include deal offerings on the provider's mobile app.

In an embodiment, a user interface may present the display 700 that includes a mobile application custom feature list that may include one or more fields to customize the base mobile application. In an example, the fields may be associated with a respective application module stored in the data store. The user interface may receive the mobile application custom feature list that may include features to customize the base mobile application. The features may be extracted and integrated with the base mobile application.

FIG. 8 is a display 800 for receiving an indication of special features 810 from a specific provider. For example, if a provider wants to offer deals on their mobile app, the display 800 may allow the provider to include different types of deal offerings 810 such as a percentage off, a special clearance, a coupon code, free shipping, etc. In an embodiment, a user interface may present the display 800 that includes a special feature list that may include one or more fields or check boxes to customize the base mobile application. In an example, the fields may be associated with a respective application module stored in the data store. The user interface may receive the mobile application custom feature list that may include features to customize the base mobile application. The features may be extracted and integrated with the base mobile application.

Figure 9:
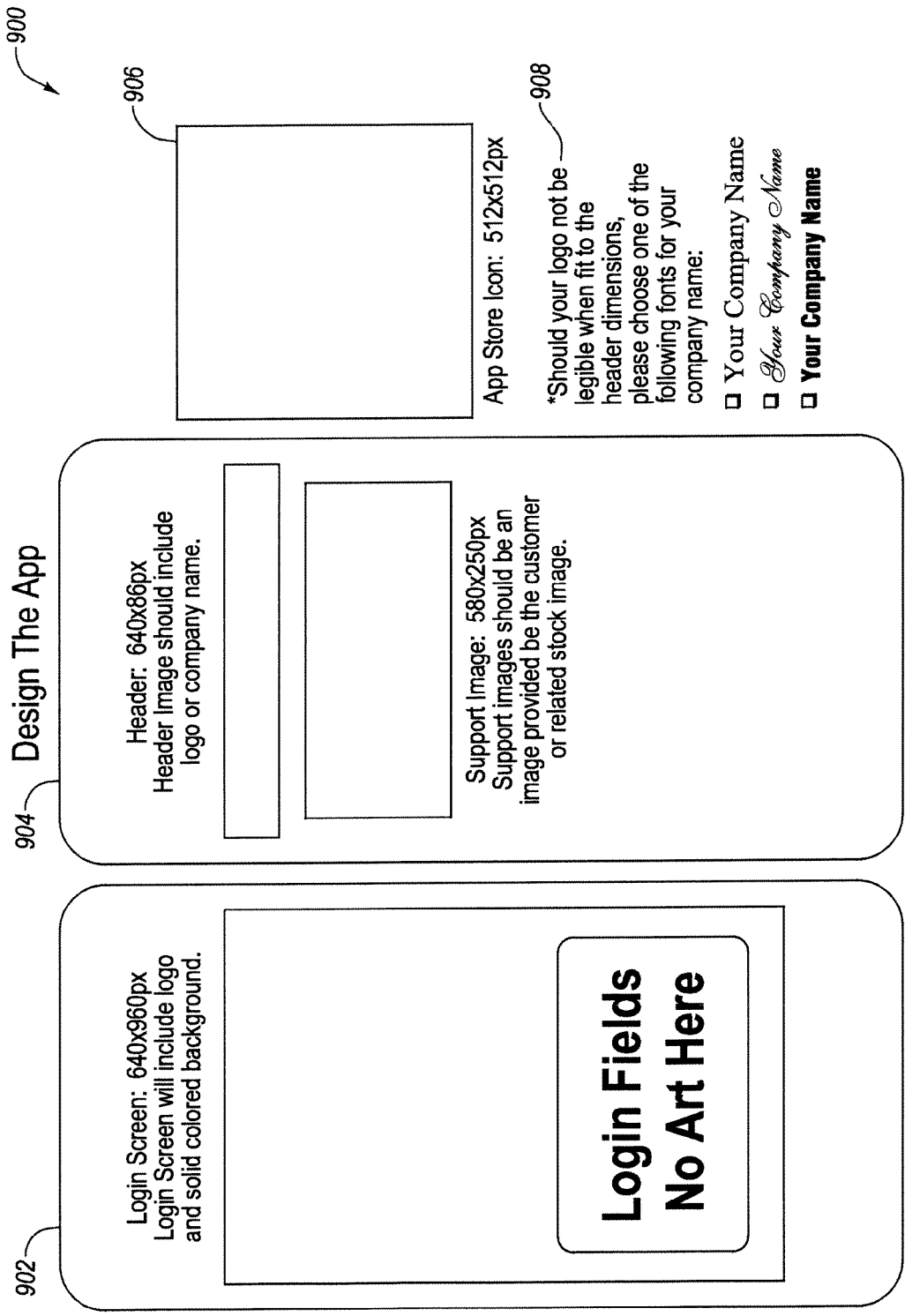

FIG. 9 is a display 900 of an application from a specific provider that may have been generated by the application generation server 108 based on the information that may have been received from the provider as discussed above with respect to FIGS. 5-8. The display 900 may include a mobile application design template 902 for inserting a photo or image, a logo, graphics, and other art as designated by the provider. In one embodiment, the mobile application design template 902 may be an interactive display that allows the provider to modify the photo, image, graphics, or logo. The mobile application design template 902 may include design fields 904 to design the base mobile application. The display 900 may also include an icon area 906 for creating an icon that may be displayed in an app store or app marketplace. The icon area 906 may include instructions 908 for creating the icon to be displayed. In an embodiment, a user interface may receive input for the base mobile application via the mobile application design template. The input may be extracted and integrated with the base mobile application.

Figure 10:
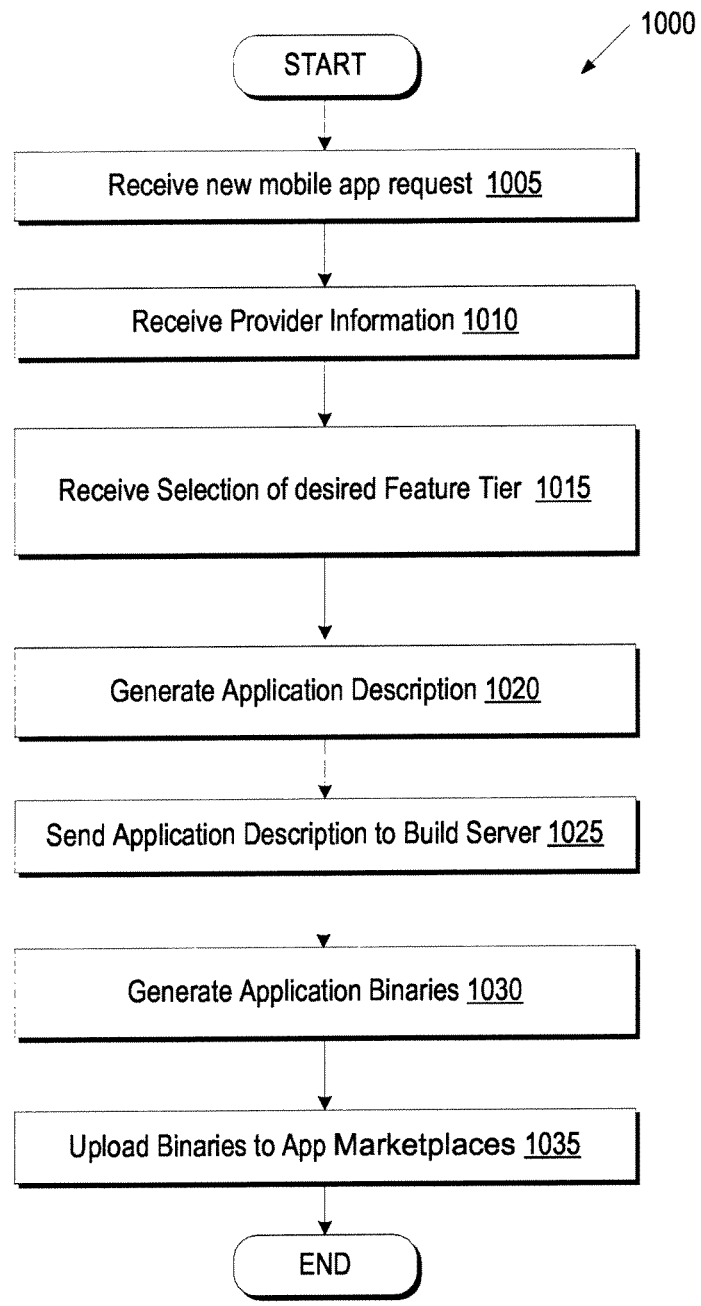
FIGS. 10-12 are flow diagrams of automated application generation according to various embodiments.

FIG. 10 is flow diagram of automated application generation according to an embodiment. The method 1000 is performed by processing logic that may comprise hardware (circuitry, dedicated logic, etc.), software (such may be executed on a general-purpose computing system or a dedicated machine), or a combination of both. At block 1005, the processing logic may begin the workflow by receiving a request from a provider to create a new mobile app. At block 1010, the processing logic may receive provider-specific application information and provider-specific content for the mobile app. Such provider-specific application information and content may include the types of information as discussed above with reference to FIGS. 5-8. At block 1015, the processing logic may receive a selection of a desired tier level. For example, the processing logic may offer the provider with different levels of functionality for their mobile app, ranging from the basic level with a basic service offering to a premium level having a greater offering of services. The difference in prices between the different levels may reflect the respective market values for the services. The provider may chose a level based in part in their price sensitivity.

At block 1020, the application description generator 212 may generate an application description based on the provider-specific application information. The application description may include a selection of one or more application features for the mobile app. At block 1025, the processing logic may send the application description to the Application Build Server 216. At block 1030, the processing logic may generate or retrieve a base mobile application that may be stored in the data storage 170. In an embodiment, the base mobile application may be previously generated base application software code. At block 1035, the processing logic may upload application binaries for the base mobile application to the app marketplaces 230 for consumer distribution and the method 1000 ends.

Figure 11:
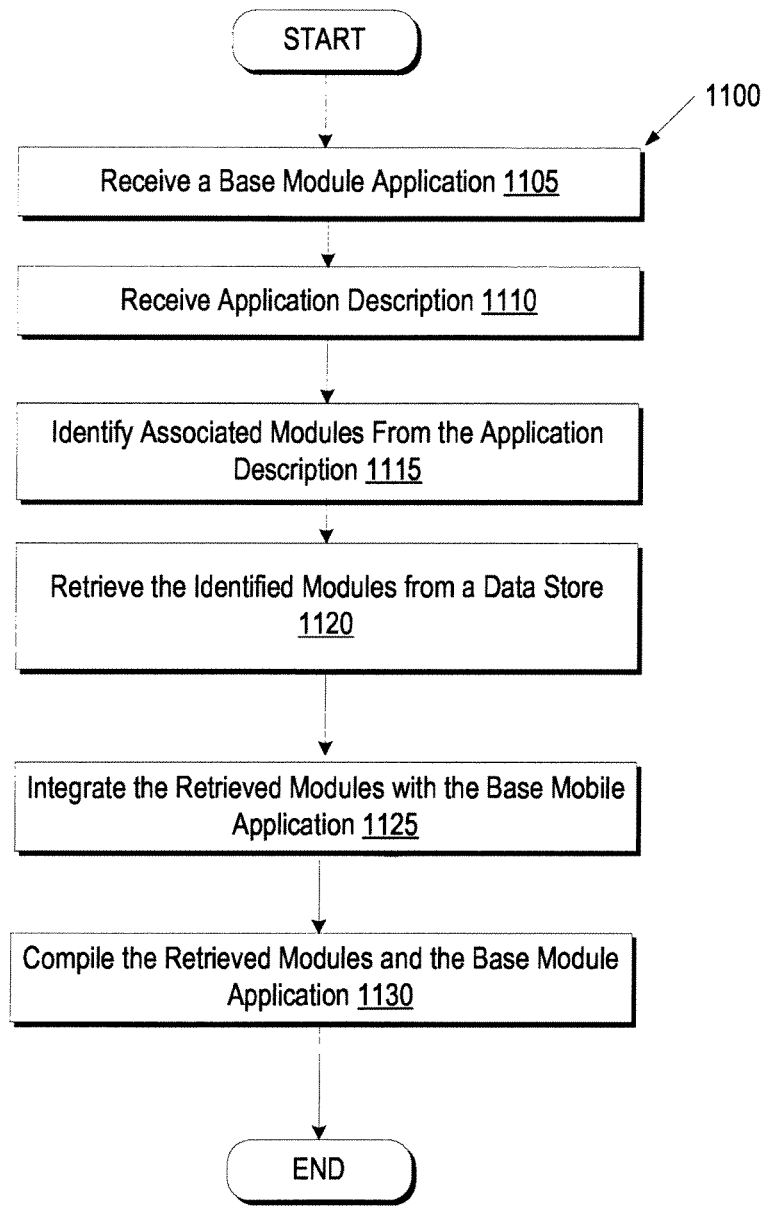

FIG. 11 is flow diagram of an example of a method 1100 of automated application generation. The method 1100 is performed by processing logic that may comprise hardware (circuitry, dedicated logic, etc.), software (such may be executed on a general-purpose computing system or a dedicated machine), or a combination of both. At block 1105, the processing logic may begin the workflow by receiving a base module application from, for example, the data storage 170. At block 1110, the processing logic may receive an application description that may have been generated by the application description generator 212. At block 1115, the processing logic may associate application features from the application description with application modules. At block 1120, the processing logic may select and retrieve the identified application modules from the data storage 170 based on a selection of one or more application features specified in the application description. In an embodiment, the application modules can include additional previously-generated base application software code for an application feature to run in connection with the base mobile application.

At block 1125, the processing logic may integrate the retrieved application modules with the base application module. The processing logic may also integrate the provider-specific content into a user interface of the base mobile application and may also integrate the base mobile application and the selected application modules.

At block 1130 the processing logic may update the base application module, for example, by adding one or more new features, and compile the retrieved application modules and the base application module and generate binary mobile application code for the mobile application in view of the modified base mobile application. The binary mobile application code may be uploaded to an app marketplace 230, and the method 1100 ends.

Figure 12:
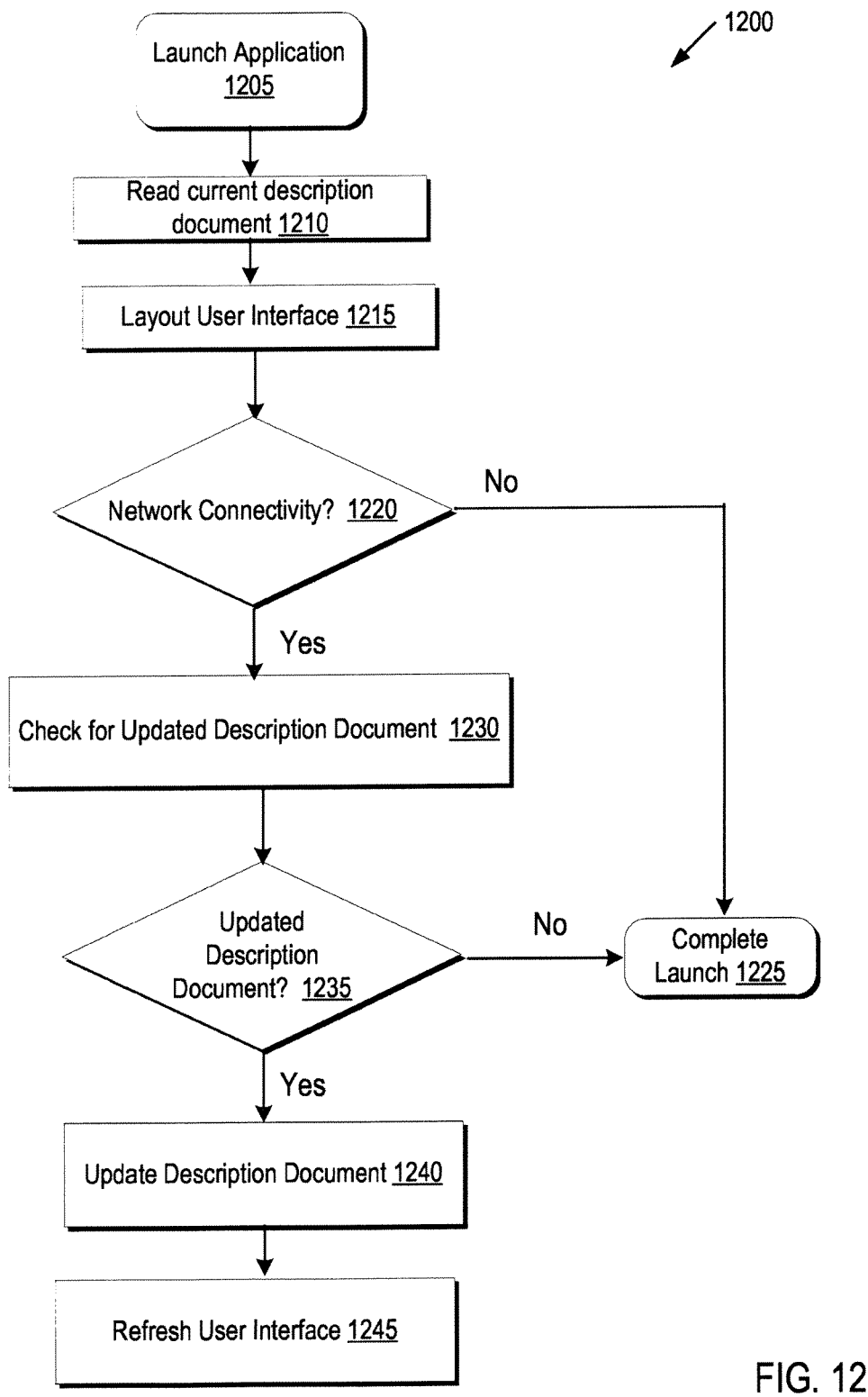

FIG. 12 is flow diagram of an example of a method 1200 of automated application generation. The method 1200 is performed by processing logic that may comprise hardware (circuitry, dedicated logic, etc.), software (such may be executed on a general-purpose computing system or a dedicated machine), or a combination of both. At block 1205, the processing logic may begin the workflow by launching a selected application. At block 1210, the processing logic may read the current description document and at block 1215, the processing logic may layout the user interface based on the current description document. At block 1220, the processing logic may check for network connectivity with the application generation server 108. If there is no network connectivity, then at block 1225, the mobile app may be launched based on the prior user interface. If at block 1220 there is network connectivity, then at block 1230, the processing logic checks for an updated description document. If at block 1235 the description document has not been updated, then at block 1225, the mobile app may be launched based on the prior user interface. If at block 1235 the description document has been updated, then at block 1240, the description document is updated. At block 1245, the user interface is refreshed based on the updated description document and the method 1200 ends.

The following examples describe instances of use cases in which the automated mobile app generator may be used.

In one example, customized features and message capabilities may be enable providers to identify consumers that have registered an account in association with a specific provider via a mobile app. In this example, a mobile app has been created for the specific provider and a consumer has downloaded the mobile app, and a consumer launches the specific provider's mobile app. The consumer may choose to create an account and enters his or her username, password and other personal identifying information via the mobile app. The mobile app may contact the application generation server 108 with the consumer's information. Upon receipt of the consumer's information, the application generation server 108 server may create an account for the consumer and the mobile app may store the consumer's information in secure storage. The mobile app can be notified of the operation's success, and the consumer may receive a message notifying the consumer of the registration's success. As a result, an account is registered for the consumer with a specific provider via the mobile app.

In another example, customized mobile app features and message capabilities may enable a consumer to follow a specific provider on a social network service such as the Twitter® service. In this example, a mobile app has been created for the specific provider, both the specific provider and the consumer have a social network account such as an account with the Twitter® service, the consumer has downloaded the mobile app, and the consumer launches the specific provider's mobile app. The consumer may navigate the mobile app to a provider information section and tap on a "Follow on Twitter®" button. The mobile app may request the consumer's Twitter® credentials and upon verification of the credentials, may contact the Twitter® server with a follow request. As a result, the consumer now can display and follow the provider on the Twitter® service.

In another example, customized mobile app features and message capabilities may enable a consumer to display his or her support for a specific provider on a social network such as the Facebook® network. In this example, a mobile app has been created for the specific provider, the both the specific provider and the consumer have a social network account such as an account with the Facebook® service, the consumer has downloaded the mobile app, and the consumer launches the specific provider's mobile app. The consumer may navigate the mobile app to the provider information section and taps on the "Like on Facebook®" button. The mobile app requests the consumer's Facebook® credentials. Upon verification of the consumer's credentials, the mobile app may contact the Facebook® server with the like request. As a result, the consumer can "like" a specific provider on the Facebook® service via the mobile app.

In another example, customized mobile app features and message capabilities may enable a consumer to send a specific provider a message. In this example, a mobile app has been created for the specific provider, the consumer has downloaded the mobile app, and the consumer has registered an account with the specific provider. The consumer may launch the mobile app, navigate the mobile app to the provider messages section, and tap on a "New Message" button. The mobile app may present a message composer for the consumer to type a message. When the consumer is finished typing the message, the consumer may tap the send button. The mobile app may submit the message to the processing logic, which may route the message to the specific provider's mailbox. The message may appear in the specific provider's mobile application dashboard and the specific provider may be notified via e-mail that he or she has received a message from the consumer.

It is noted that the preceding use cases have been provided as examples and that other use cases may be achieved as would be appreciated by one of ordinary skill in the art having the benefit of this disclosure.

FIGS. 13A-13E, 14A and 14B are displays of an automated mobile application generator according to various embodiments. Each of the displays in FIGS. 13A-13E, 14A and 14B is a customized display of the same automatically generated custom mobile app. The displays in FIGS. 13A-13E are consumer displays while the displays in FIGS. 14A and 14B are provider displays. As explained below in further detail, the consumer display and provider display may show different types of information while originating from the same mobile app.

In an embodiment, an app server such as the server computing system 108, can distinguish a provider from a consumer based on login information. For example, an app server can receive login information from a user using an instance of a mobile application executing on a device and determine whether the user is a consumer or a provider in view of the login information. Once the determination is made, the app server can grant a provider access level to the mobile application when the user is the provider and grant a consumer access level to the mobile application when the user is the consumer.

Figure 13B:
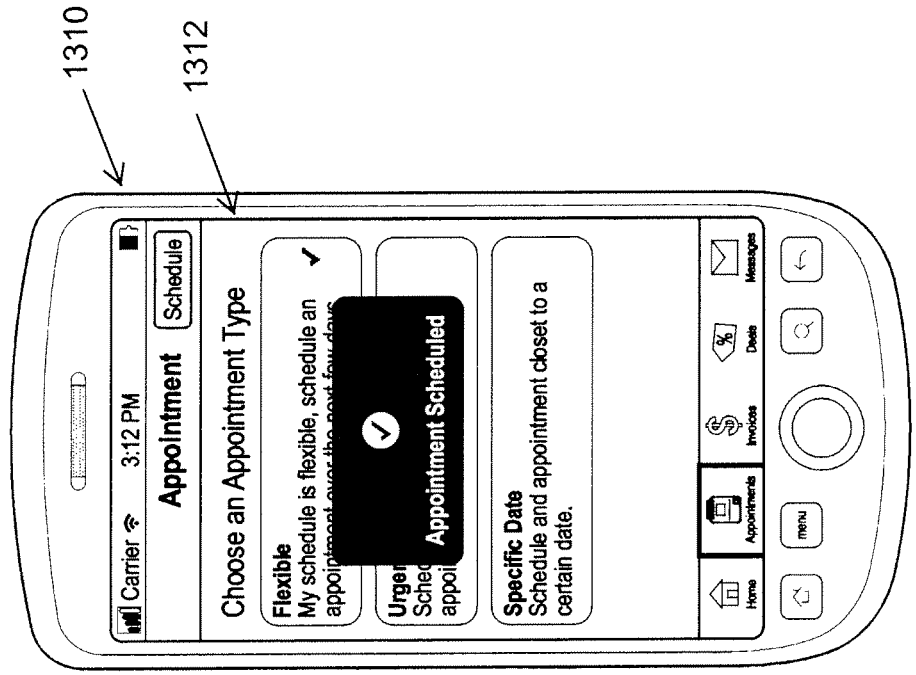
Figure 13A:
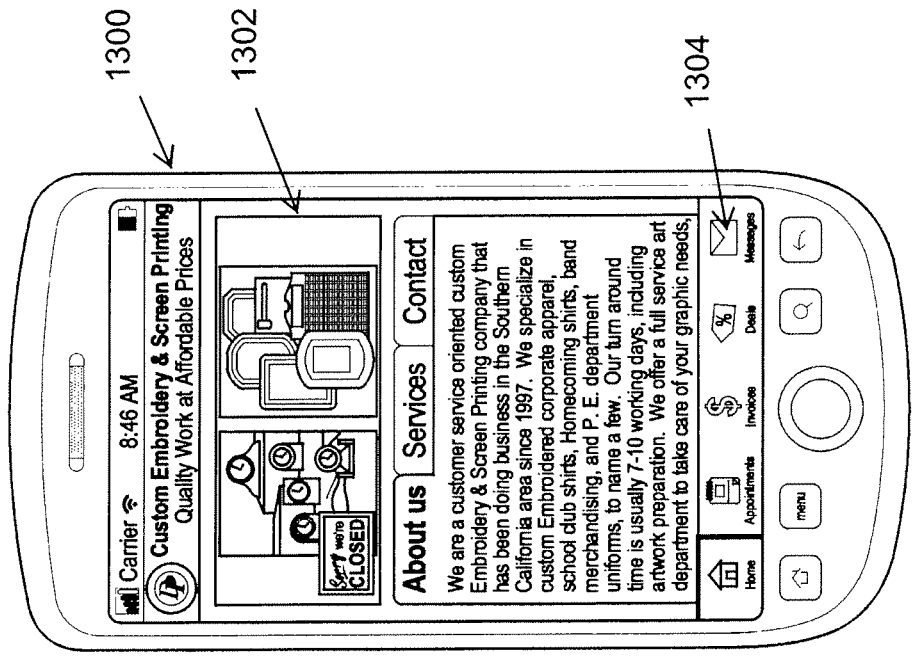

FIG. 13A illustrates an example home page 1300 of a provider that can be displayed to the consumer. The home page 1300 may include graphics 1302 such as a photo, a logo, and tabs that may describe general information about the line of business, services or products that are offered, and contact information. The home page 1300 may also display a set of tabs 1304 for specific feature pages, such as appointments, services, deals, and messages.

FIG. 13B illustrates an example appointment feature page 1310 of a provider that can be displayed to the consumer. The appointment feature page 1310 may include fields 1312 for a type of appointment for a service. The consumer may for example schedule an appointment, specific a preferred date and time of the appointment, or accept or decline an appointment via the appointment feature page of the mobile app.

Figure 13D:
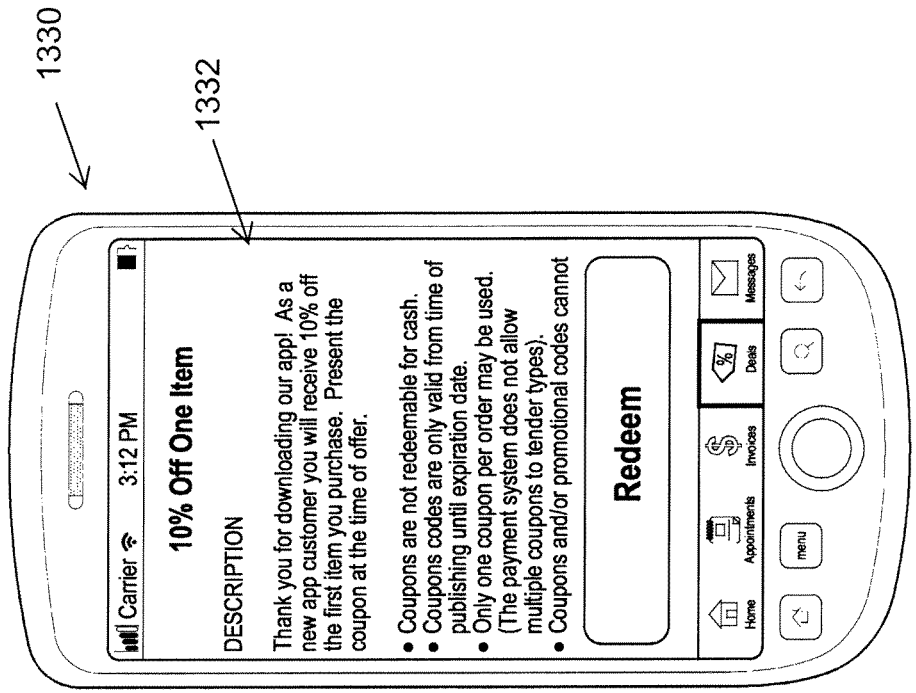
Figure 13C:
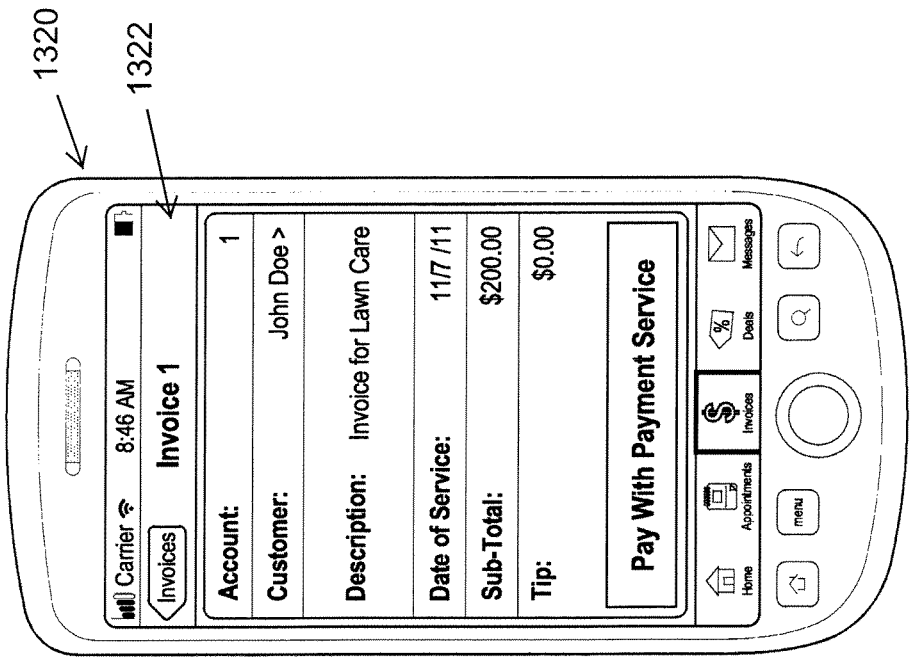

FIG. 13C illustrates an example invoice feature page 1320 of a provider that can be displayed to the consumer. The invoice feature page 1320 may display an invoice 1322 from the provider. The invoice feature page 1320 may include information such as the consumer name, description of the product purchased or provided service, the date, and the total amount due. The invoice feature page 1320 may include an option for the consumer to pay via a payment service such as the PayPal® service.

FIG. 13D illustrates an example deals feature page 1330 of a provider that can be displayed to the consumer. The deals feature page 1330 may include a coupon 1332 for a discount for a particular product or service. The consumer may redeem the coupon 1332 via the deals feature page 1330 of the mobile app.

Figure 13E:
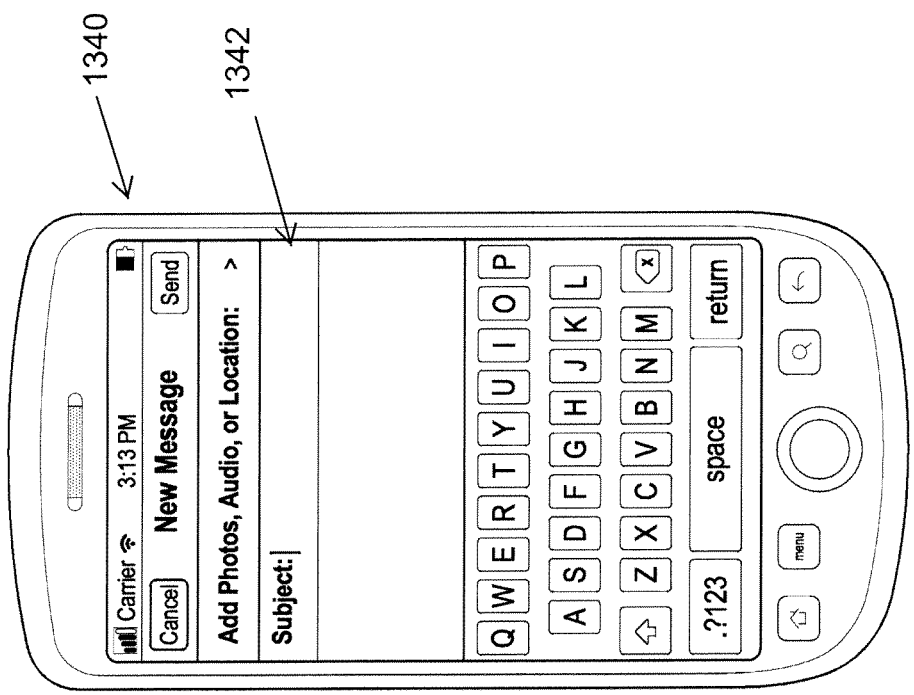

FIG. 13E illustrates an example message feature page 1340 of a provider that can be displayed to the consumer. The message feature page 1340 may include message fields 1342 that enable the consumer to communicate with the provider electronically.

FIGS. 14A and 14B are displays of an automated application generator according to various embodiments.

FIG. 14A illustrates an example customer or consumer information page 1400 that can be displayed to the provider. The consumer information page 1400 may include a customer list 1402 and may enable the provider to view a listing of his or her customers or consumers. The customer list 1402 may include contact information such as email address. In an example, if a customer or consumer is not registered, the provider may enter the consumer information such as his or her name, email address, and so on.

FIG. 14B illustrates an example appointment feature page 1410 that can be displayed to the provider. The appointment feature page 1410 may include appointment fields 1412 that display a list of consumers that may have requested an appointment and the reason for the appointment. The provider can confirm the appointment request, reschedule the appointment request, or deny the appointment request via the appointment feature page 1410.

Figure 15:
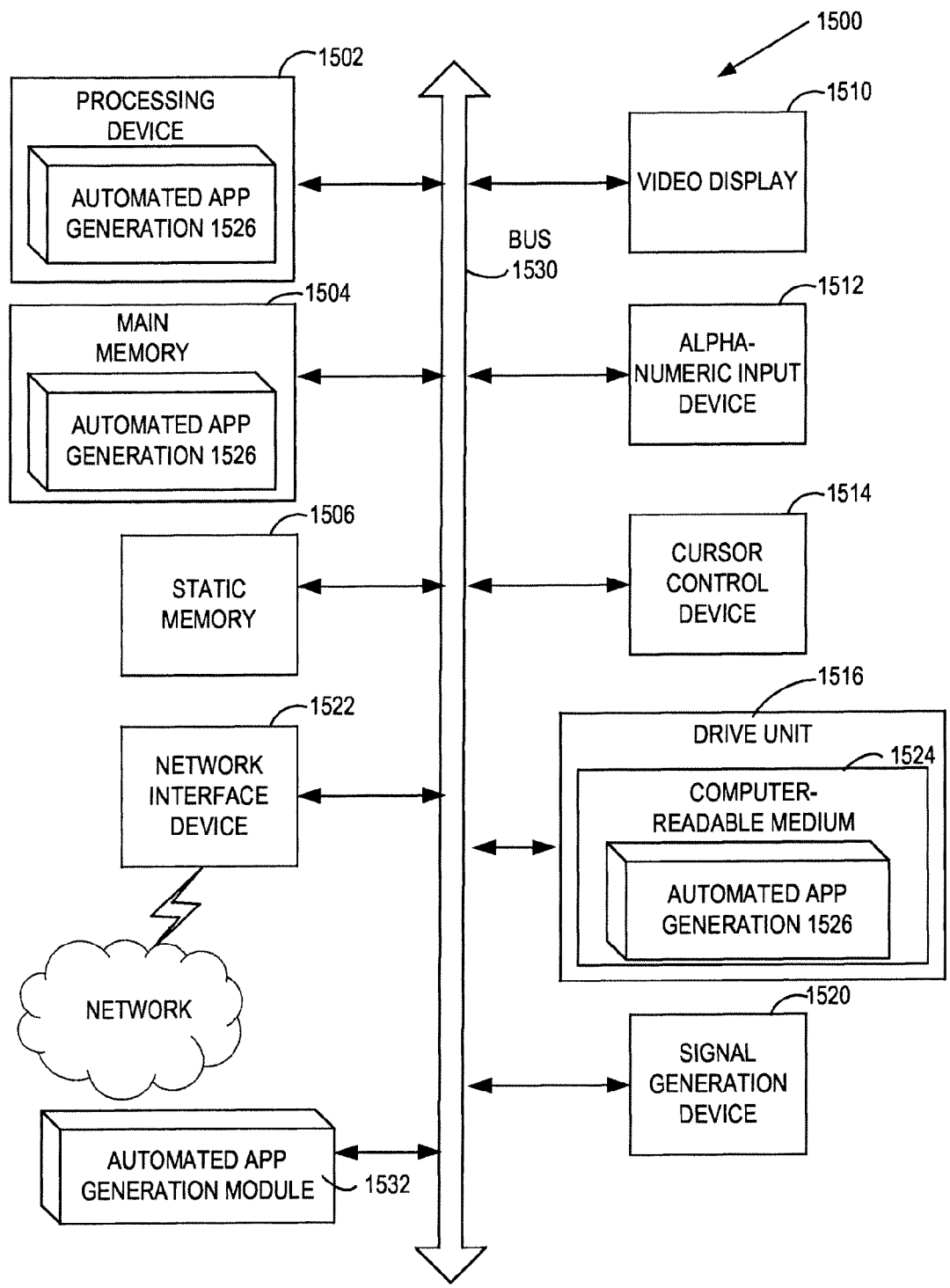
FIG. 15 illustrates a diagrammatic representation of one embodiment of a machine in the example form of a computing system for automated application generation.

FIG. 15 depicts a diagrammatic representation of one embodiment of a machine in the form of a computer system 1500 for automated application generation. Within the computing system which a set of instructions 1526, for causing the machine to perform any one or more of the methodologies discussed herein. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines (e.g., computers) that individually or jointly execute a set (or multiple sets) of instructions to perform any one or more of the methodologies discussed herein.

The computer system 1500 includes a processing device 1502, a main memory 1504 (e.g., read-only memory (ROM), flash memory, dynamic random access memory (DRAM) such as synchronous DRAM (SDRAM), etc.), a static memory 1506 (e.g., flash memory, static random access memory (SRAM), etc.), and a secondary memory 1516 (e.g., a data storage device), which communicate with each other via a bus 1530.

The processing device 1502 represents one or more general-purpose processing devices such as a microprocessor, central processing unit, or the like. More particularly, the processing device 1502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1502 may also be one or more special-purpose processing devices such as an application specific integrated circuit (ASIC), a field programmable gate array (FPGA), a digital signal processor (DSP), network processor, or the like. The processing device 1502 is configured to execute the operations for the application generation server 108 for performing steps discussed herein.

The computer system 1500 may further include a network interface device 1522. The network interface device may be in communication with a network 1521. The computer system 1500 also may include a video display unit 1510 (e.g., a liquid crystal display (LCD), a touch screen, or a cathode ray tube (CRT)), an alphanumeric input device 1512 (e.g., a keyboard), a cursor control device 1514 (e.g., a mouse), and a signal generation device 1520 (e.g., a speaker).

The secondary memory 1516 may include a computer-readable storage medium (or more specifically a non-transitory computer-readable storage medium) 1524 on which is stored one or more sets of instructions 1526 (e.g., instructions executed by the application generation server 108) for the computer system 1500 representing any one or more of the methodologies or functions described herein. The instructions 1526 for the computer system 1500 may also reside, completely or at least partially, within the main memory 1504 and/or within the processing device 1502 during execution thereof by the computer system 1500, the main memory 1504 and the processing device 1502 also constituting computer-readable storage media. The instructions 1526 for the computer system 1500 may further be transmitted or received over a network interface device 1522.

While the computer-readable storage medium 1524 is shown in an example to be a single medium, the term "computer-readable storage medium" should be taken to include a single medium or multiple media (e.g., a centralized or distributed database, and/or associated caches and servers) that store the one or more sets of instructions 1526. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   receiving, by a processing device, a request to create a mobile application, the request comprising provider-specific application information and provider-specific content for the mobile application;
   generating, by the processing device, an application description based on the provider-specific application information, wherein the application description comprises a selection of one or more application features for the mobile application;
   retrieving, by the processing device, a base mobile application stored in a data store, wherein the base mobile application comprises previously generated base application software code, and wherein the base mobile application is configured to display a first view to a provider and a second view to a consumer;
   modifying, by the processing device, the base mobile application in view of the application description, wherein modified the base mobile application is configured to display the first view to the provider and the second view to the consumer;
   generating, by the processing device, binary mobile application code for the mobile application in view of the modified base mobile application; and
   uploading, by the processing device, the modified base mobile application to an application distribution platform.

2. The method of claim 1, wherein the modifying the base mobile application comprises:
   selecting one or more application modules from a plurality of application modules stored in the data store in view of the selection of one or more application features specified in the application description, wherein at least one of the plurality of application modules comprises additional previously-generated base application software code for an application feature to run in connection with the base mobile application;
   integrating the selected one or more application modules to the base mobile application;
   integrating the provider-specific content into a user interface of the base mobile application; and
   integrating the base mobile application and the selected application.

3. The method of claim 1, further comprising uploading the binary mobile application code to an application marketplace.

4. The method of claim 2, further comprising presenting the user interface to receive the request to create the mobile application, the provider-specific application information and the provider-specific content.

5. The method of claim 4, further comprising:
displaying, by the user interface, a mobile application form comprising fields for the provider-specific content;
receiving, by the user interface, the mobile application form comprising the provider-specific content; and
extracting the provider-specific content from the mobile application form.

6. The method of claim 4, further comprising:
displaying, by the user interface, fields to receive application-specific business information and graphics;
receiving, by the user interface, application-specific business information and graphics;
extracting the specific business information and graphics; and
populating content fields of the base mobile application with the application-specific business information and graphics.

7. The method of claim 4, further comprising:
displaying, by the user interface, a mobile application custom feature list in the user interface comprising one or more fields to customize the base mobile application, wherein the fields are associated with a respective application module stored in the data store;
receiving, by the user interface, the mobile application custom feature list comprising features to customize the base mobile application;
extracting the features; and
integrating the features with the base mobile application.

8. The method of claim 4, further comprising:
displaying, by the user interface, a mobile application design template in the user interface comprising fields to design the base mobile application;
receiving, by the user interface, the mobile application design template comprising input for the base mobile application;
extracting the input; and
integrating the input with the base mobile application.

9. The method of claim 1, further comprising:
associating the one or more application features with one or more respective application modules; and
retrieving the one or more respective application modules from a data store.

10. The method of claim 1, further comprising:
determining whether the mobile application has been updated; and refreshing the user interface when the mobile application has been updated.

11. The method of claim 1, further comprising:
presenting a first user interface display on a first mobile device and a first functionality of the mobile application to a provider; and
presenting a second user interface display on a second mobile device and a second functionality of the mobile application to a consumer.

12. The method of claim 1, further comprising:
receiving, at an app server, login information from a user using an instance of a mobile application executing on a device;
determining, by the app server, whether the user is a consumer or a provider in view of the login information;
granting a provider access level to the mobile application when the user is the provider;
granting a consumer access level to the mobile application when the user is the consumer.

13. An apparatus comprising:
a memory; and
a processing device communicably coupled to the memory and to:

receive a request to create a mobile application, the request comprising provider-specific application information and provider-specific content for the mobile application;
generate an application description based on the provider-specific application information, wherein the application description comprises a selection of one or more application features for the mobile application;
retrieve a base mobile application stored in a data store, wherein the base mobile application comprises previously generated base application software code, and wherein the base mobile application is configured to display a first view to a provider and a second view to a consumer;
modify the base mobile application in view of the application description, wherein the modified base mobile application is configured to display the first view to the provider and the second view to the consumer;
generate binary mobile application code for the mobile application in view of the modified base mobile application; and
upload the modified base mobile application to an application distribution platform.

14. The apparatus of claim 13, wherein modify the base mobile application comprises:
select one or more application modules from a plurality of application modules stored in the data store in view of the selection of one or more application features specified in the application description, wherein at least one of the plurality of
application modules comprises additional previously-generated base application software code for an application feature to run in connection with the base mobile application;
integrate the selected one or more application modules to the base mobile application;
integrate the provider specific content into a user interface of the base mobile application; and
integrate the base mobile application and the selected application modules.

15. The apparatus of claim 13, further comprising upload the binary mobile application code to an application marketplace.

16. The apparatus of claim 14, further comprising present the user interface to receive the request to create the mobile application, the provider-specific application information and the provider-specific content.

17. The apparatus of claim 16, further comprising:
display, by the user interface, a mobile application form comprising fields for the provider-specific content;
receive, by the user interface, the mobile application form comprising the provider-specific content; and
extract the provider-specific content from the mobile application form.

18. The apparatus of claim 16, further comprising:
display, by the user interface, fields for application-specific business information and graphics;
receive, by the interface, application-specific business information and graphics;
extract the specific business information and graphics; and
populate the content fields of the base mobile application with the specific business information and graphics.

19. A non-transitory computer readable storage medium including instructions that, when executed by a processing device, cause the processing device to execute operations comprising:
receiving, by a processing device, a request to create a mobile application, the request comprising provider-specific application information and provider-specific content for the mobile application;

generating, by the processing device, an application description based on the provider-specific application information, wherein the application description comprises a selection of one or more application features for the mobile application;

retrieving, by the processing device, a base mobile application stored in a data store, wherein the base mobile application comprises previously generated base application software code, and wherein the base mobile application is configured to display a first view to a provider and a second view to a consumer;

modifying, by the processing device, the base mobile application in view of the application description, wherein the modified base mobile application is configured to display the first view to the provider and the second view to the consumer;

generating, by the processing device, binary mobile application code for the mobile application in view of the modified base mobile application; and uploading, by the processing device, the modified base mobile application to an application distribution platform.

20. The non-transitory computer readable storage medium of claim 19, wherein the modifying the base mobile application comprises:

selecting one or more application modules from a plurality of application modules stored in the data store in view of the selection of one or more application features specified in the application description, wherein at least one of the plurality of application modules comprises additional previously-generated base application software code for an application feature to run in connection with the base mobile application;

integrating the selected one or more application modules to the base mobile application;

integrating the provider-specific content into a user interface of the base mobile application; and integrating the base mobile application and the selected application.

21. The non-transitory computer readable storage medium of claim 19, further comprising uploading the binary mobile application code to an application marketplace.

22. The non-transitory computer readable storage medium of claim 20, further comprising presenting the user interface to receive the request to create the mobile application, the provider-specific application information and the provider-specific content.

23. The non-transitory computer readable storage medium of claim 22, further comprising:

displaying, by the user interface, a mobile application form comprising fields for the provider-specific content;

receiving, by the user interface, the mobile application form comprising the provider-specific content; and extracting the provider-specific content from the mobile application form.

* * * * *